Feb. 24, 1931.  G. A. E. STRAWN  1,793,650
POWER TRANSMISSION MECHANISM
Filed July 30, 1929   2 Sheets-Sheet 2
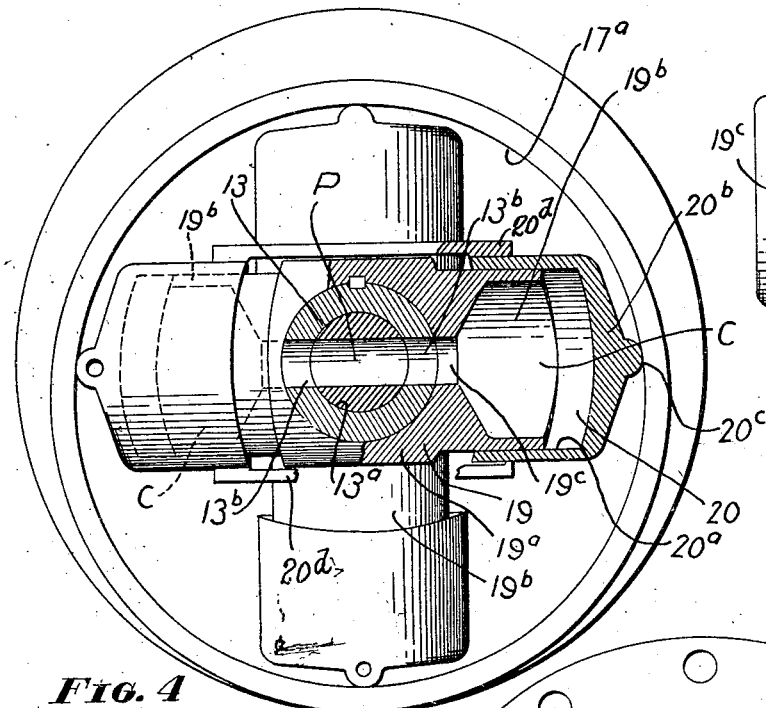
FIG. 4
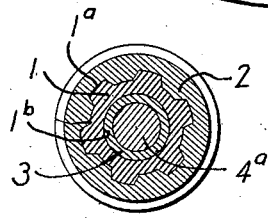
FIG. 7
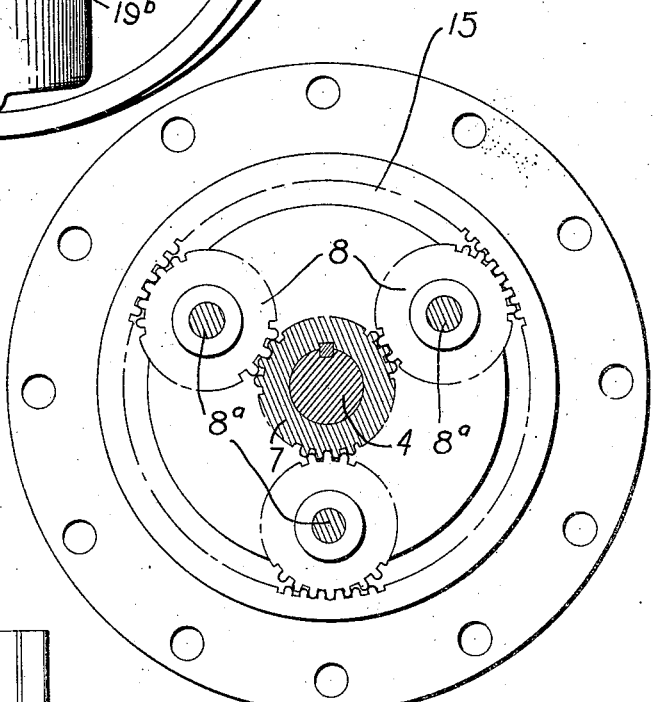
FIG. 5
FIG. 6
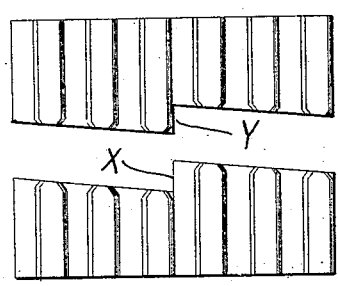
FIG. 8
INVENTOR.
GUY A. E. STRAWN
BY
A. B. Bowman
ATTORNEY Patented Feb. 24, 1931

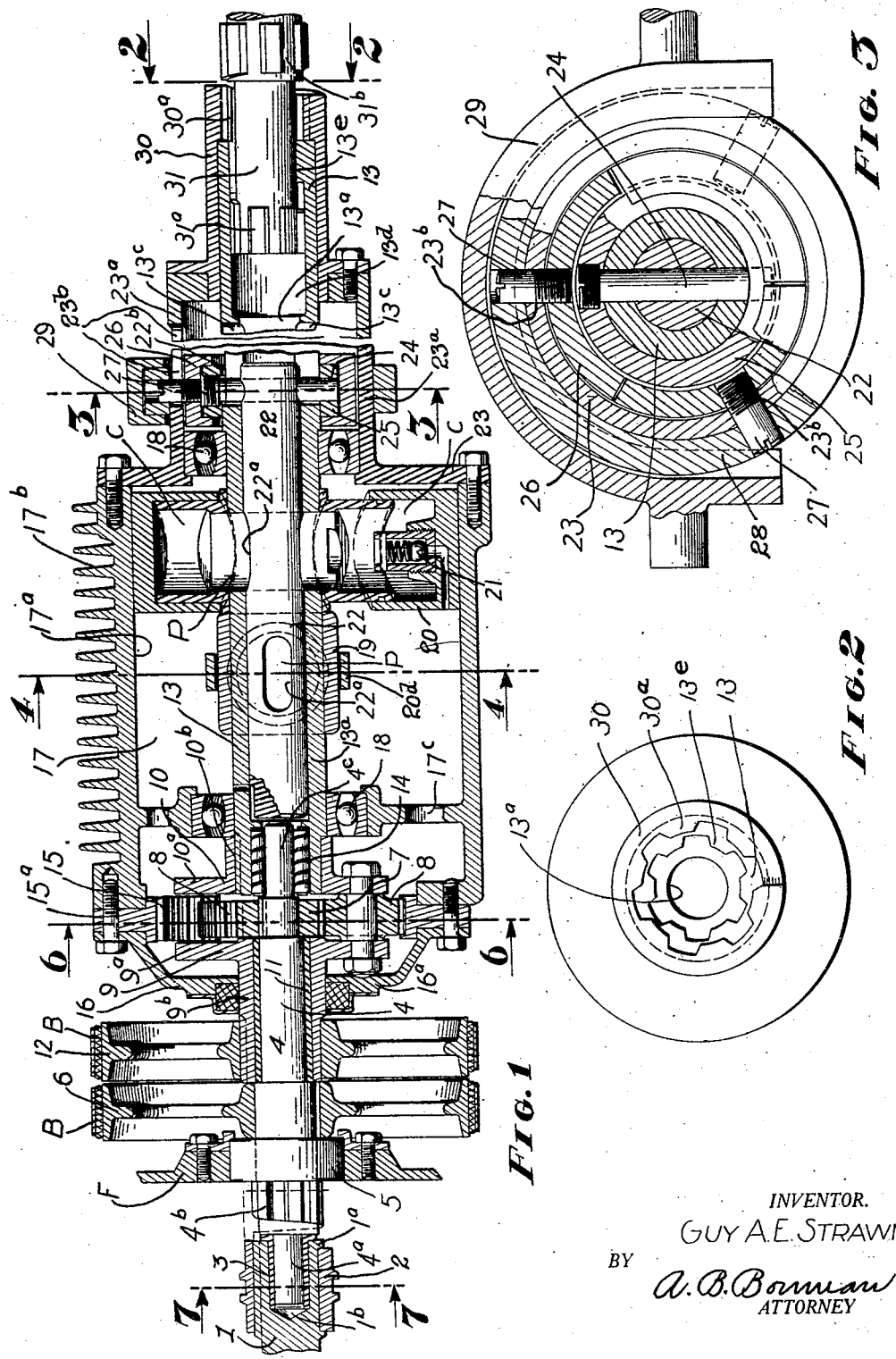

1,793,650

UNITED STATES PATENT OFFICE

GUY A. E. STRAWN, OF VISTA, CALIFORNIA

POWER-TRANSMISSION MECHANISM

Application filed July 30, 1929. Serial No. 382,126.

My invention relates to power transmission mechanism, and the objects of my invention are: first, to provide a mechanism of this class which is especially adapted for use in connection with vehicles, such as automobiles; second, to provide a mechanism of this class which enables the driven side thereof to gradually and uniformly increase in speed while under load; third, to provide a power transmission mechanism which eliminates the conventional automobile gear transmission; fourth, to provide a power transmission mechanism in which the driven side may rotate in either direction, thereby providing a reverse means when used for an automobile transmission; fifth, to provide a power transmission mechanism which may be used as a retarding device for descending grades or for slowing the speed of the vehicle, thereby taking the load off the motor; sixth, to provide a power transmission mechanism which enables the motor to run at an economical, substantially constant speed while the speed of the car is varied to suit the needs of the driver; seventh, to provide a power transmission mechanism which is practically fool-proof; and eighth, to provide on a whole, a novelly constructed power transmission mechanism which is simple of construction proportional to its functions, compact, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a sectional view through my power transmission mechanism, with the driving shaft and the sliding shaft shown fragmentarily, and with parts and portions in elevation to facilitate the illustration; Fig. 2 is an enlarged end elevational view of my mechanism taken from 2—2 of Fig. 1, with the sliding shaft removed; Fig. 3 is an enlarged transverse sectional view through 3—3 of Fig. 1, with parts and portions shown in elevation to facilitate the illustration; Fig. 4 is another enlarged transverse sectional view, with parts and portions shown in elevation to facilitate the illustration; Fig. 5 is an end elevational view of one of the cross members; Fig. 6 is a transverse sectional view through 6—6 of Fig. 1, with parts and portions shown in elevation to facilitate the illustration; Fig. 7 is a transverse sectional view through 7—7 of Fig. 1; and Fig. 8 is a developed view of one of the shaft interlocking means, showing the relationship of the fluted portions.

Similar characters of reference refer to similar parts and portions throughout the several views of the drawings.

Driving shaft 1, sleeve 2, bushing 3, connecting shaft 4, bearing 5, brake drum 6, pinion gear 7, planetary gears 8, cage members 9 and 10, bushing 11, reverse speed drum 12, transmission shaft 13, connecting shaft bearing 14, ring gear 15, end plate 16, casing 17, transmission shaft bearing 18, cross members 19, riders 20, check valves 21, valve rod 22, end member 23, valve rod pin 24, collar member 25, collar shifting segments 26, pin members 27, ring member 28, yoke 29, sleeve member 30, and sliding shaft 31, constitute the principal parts and portions of my power transmission mechanism.

A drive shaft 1 is provided, which is connected to a suitable prime mover not shown. An end of the drive shaft connected with my mechanism is provided with an externally fluted portion 1a, as shown in Figs. 1 and 7. A sleeve member 2, fitted to interlock with the fluted portion 1a, is adapted to slide thereupon.

The end of the drive shaft 1 is provided with a socket 1b therein, in which fits a bushing 3 for journalling a reduced end portion 4a of a connecting shaft 4 which extends outwardly from the drive shaft 1, in alinement therewith, as shown best in Fig. 1.

The end of the connecting shaft 4 abutting the drive shaft 1 has substantially the same diameter as said drive shaft, and is provided with an externally fluted portion 4b corresponding to the fluted portion 1a. The sleeve 2 is adapted to be shifted over the fluted portion 4b so as to link the drive shaft with the connecting shaft, as shown by the dotted lines in Fig. 1.

Adjacent the fluted portion 4b and on the side thereof towards the extended end of the connecting shaft 4, there is provided a bearing 5 which is mounted in a suitable frame F so as to support this end of the connecting shaft. Adjacent to the bearing 5, at the side thereof opposite from the drive shaft 1, is secured a brake drum 6.

At the extended end of the connecting shaft 4, said shaft is reduced in cross section and provided with a small pinion gear 7 which is adapted to mesh with a plurality of spaced apart planetary gears 8 arranged therearound on pin members 8a which are secured by their ends to cage members 9 and 10.

The cage member 9 comprises a cage portion 9a, which is a substantially flat disk to which the one end of the various planetary gear pins is secured. A sleeve member 9b extends from the cage portion of the cage member 9 forwardly or towards the brake drum 6, along the connecting shaft 4, and is spaced therefrom by bushing 11. The sleeve portion 9b extends until adjacent the brake drum 6. A reverse sleeve drum 12 is secured to this extended end of the sleeve portion 9b. The other cage member 10 comprises a plate-like cage portion 10a joining the other ends of the pins 8a which support the planetary gears 8, and a rearwardly extending hub portion 10b which secures the cage member 10 to a transmission shaft 13. The reduced end of the connecting shaft 4 extends rearwardly a short distance from the pinion gear 7 into a longitudinally extending opening or bore 13a, which extends the length of the transmission shaft 13. This portion of the connecting shaft 4 forms a journal 4c which is spaced from the inner walls of the bore 13a of the transmission shaft by a connecting shaft bearing 14, as shown in Fig. 1.

A ring gear 15, having internally extending teeth, extends around the planetary gears 8 and is adapted to mesh therewith. The ring gear 15 is provided with a radially extending flange portion 15a, to the one side of which is secured an end plate 16 which extends inwardly and rearwardly so as to enclose the ring gear, planetary gear and pinion gear. The end plate 16 surrounds the sleeve portion 9b of the cage member 9, and is provided with a packing flange 16a so as to form a fluid-tight joint therewith.

Secured to the flange portion 15a of the ring gear 15, at the opposite side thereof from the end plate 16, is a casing 17. The casing 17 is substantially annular, as shown in Fig. 4, and extends rearwardly over the transmission shaft 13. The inner bore 17a of the casing 17 is substantially annular, but eccentrically located relative to the transmission shaft 13, as shown in Figs. 1 and 4. The outer margin of the casing is preferably concentric with the transmission shaft so that portions thereof may be provided with a plurality of ribs 17b for radiating heat.

A transmission shaft bearing 18, held by a web 17c which extends inwardly from the walls of the casing, supports the end of the transmission shaft adjacent to the connecting shaft 4, as shown in Fig. 1.

Rearwardly of the bearing 18 and within the casing 17, there are secured to the transmission shaft two cross members 19, as shown in Figs. 1, 4 and 5. The axes of the two cross members are preferably at right angles with each other. Each cross member is provided with a hub portion 19a which surrounds the shaft and is keyed thereon. Extending in opposite directions from the hub portions 19a, are cylinder portions 19b which are annular in cross section and hollow. The head of each cylinder portion 19b adjoining the hub 19a is closed except for a slot 19c which extends longitudinally with the shaft 13, and registers with a similarly shaped slot 13b therein, intersecting the bore 13a of said transmission shaft.

The open or extended end of each cylinder portion 19b is capped by a rider member 20, having a sleeve portion adapted to fit over the cylinder portion 19b and form a telescoping, sliding fit.

The extended end of each sleeve portion 20a is closed by a head portion 20b, as shown in Figs. 1 and 4. Each head portion 20b is provided with a ridge or rider portion 20c which extends longitudinally with the casing 17, and is adapted to ride on the inner walls of the bore 17a thereof.

Because of the eccentric position of the bore 17a, each sleeve portion 20a is adapted to slide back and forth on its cylinder portion 19b of the cross member 19 when the transmission shaft rotates relative to the casing.

It is desired to keep the combined volume of the two chambers C walled by the cylinder portions 19a and rider members 20 at the ends of each cross member 19 substantially constant; therefore, the bore 17a of the casing 17 is not made perfectly circular, but is so shaped that all lines drawn from opposite sides of said bore 17a, through the center of the transmission shaft 13, are as nearly equal as possible. In addition, link members 20d may be secured at their end portions to the rider members 20 of each cross arm 19 and extend along the outer sides of said cross arm.

One or both of the rider members 20 of each cross arm is provided with a check valve 21 which permits fluids to pass into the chamber formed with the corresponding cylinder 19b, but checks the escape of fluids therefrom.

A valve rod 22 is adapted to reciprocate in the bore 13a of the transmission shaft 13. Two slots 22a extend transversely through the valve rod 22. These slots 22a are so arranged that they open and close, at the same time, the openings or slots 13b in the shaft 13, which communicate between the chambers C of each cross arm 19. Thus, by moving the rod 22 back and forth, it is possible to control the passage of fluids between the two chambers C formed at the end of each cross arm 19.

The extended or rear end of the casing 17 is closed by an end member 23 which receives the transmission shaft 13 in an axially and rearwardly extending annular shell portion 23a, arranged concentrically relative to the transmission shaft and spaced therefrom by a second transmission shaft bearing 18.

Rearwardly from the second transmission shaft bearing 18, the bore 13a of the transmission shaft 13 is intersected by two diametrically disposed slots 13c. Mounting the transmission shaft at this point is a collar member 25 which is adapted to receive a valve rod pin 24. This pin extends through the slots 13c and through a hole provided in the one end portion of the valve rod 22 so that the valve rod may be shifted back and forth relative to the transmission shaft within the limits of the slots 13c, thus regulating the passages P between the pairs of the chambers C.

A plurality of collar shifting segments 26 surround the collar 25. Each collar shifting segment 26 engages the side margins of the collar 25 so that said collar may be shifted axially by the movement of said segment, but is permitted to revolve relatively thereto. Each segment is provided with a pin member 27 which extends radially outwardly through a slot 23b formed in the shell portion 23a of the end member 23.

Each pin 27 extends into a ring member 28, which surrounds said shell portion 23a. The ring member 28 is, in turn, partially surrounded by a yoke 29 which is adapted to engage the side margins of said ring and shift it axially, but permit revoluble movement thereof. Thus, the casing 17 may be revolving in one direction and the shaft in the other direction, yet by shifting the yoke 29 axially, the valve rod 22 is caused to regulate the pasage P between the pairs of chambers C. Secured to the extended end of the shell portion 23a, is a sleeve member 30, which extends rearwardly along said transmission shaft and overhangs said rearward end. Said overhanging portion of the sleeve member 30 is internally fluted, as indicated by 30a. The extended rear end of the opening 13a in the transmission shaft 13 is slightly enlarged, forming a bearing portion 13d for an end of a sliding shaft 31. The extended rear end of the bearing portion 13d is internally fluted, as indicated by 13e. The sliding shaft 31 is provided with an externally fluted portion 31a which rides in the bearing portion 13d and meshes with the internally fluted portion 13e. Said sliding shaft 31 is provided with another externally fluted portion 31b, which is normally positioned rearwardly of the internally fluted portion 30a of the sleeve 30 so that it may be moved forwardly into engagement therewith.

When the sliding shaft is in the position shown in Fig. 1, neither fluted portion 31a or 31d is in engagement, and the mechanism, not shown, connected with said sliding shaft, is thus in neutral.

The casing is practically filled with oil, as are also the chambers C of each cross arm and the passages P connecting them. Should any oil leak out, the check valve 21 admits more oil so as to keep the chambers C and the passages P completely full of oil at all times. The oil in the casing not only keeps the chambers C full, but also lubricates the rider members 20, transmission shaft bearings 18 and 24, the valve rod operating mechanism, the various gears, and shaft bearings 14.

The operation of my power transmission mechanism is as follows:

Assuming that it is used in connection with an automobile, and the drive shaft 1 forms the crankshaft thereof, when desiring to apply power to the rear wheels of the automobile, the sleeve 2 is moved rearwardly so that it interlocks with the fluted portion 4b of the connecting shaft 4. If it is desired to move the vehicle forward, the sliding shaft 31 is moved rearwardly so that it is in engagement with the transmission shaft 13. When the automobile is in neutral, the valve rod 22 is in the position shown in Fig. 1, in which the passages P between the two chambers C formed of each cross member 19 are opened as far as possible. Rotation of the drive shaft is transmitted to the connecting shaft 4 and to both the transmission shaft 13 and casing 17. The transmission shaft tends to revolve in one direction while the casing 17 revolves in the other, thus causing a relative movement between the transmission shaft and the casing, and consequently a reciprocal movement of the sleeve portions 20a on the cylinder portions 19b, and thereby enlarging one chamber C at one end of each cross member, while reducing the size of the opposite chamber, thus causing the oil therein to pass back and forth through the passage P formed by the slots 19c, 13b, and 22a. By closing the passage P, the movement of the oil between the chambers at the end of each cross arm is hampered so as to cause a slower movement of the casing 17 and transmission shaft 13, until when the passages P are totally closed, there is little or no relative movement of the casing 17 with the transmission shaft 13.

When in such position, the drive is direct from the motor to the rear wheels of the automobile, thus by merely shifting the valve rod 22, the automobile is caused to pick up from neutral position to full speed while under a load.

If it is desired to drive the vehicle backward, the sliding shaft 31 is moved forwardly until the fluted portion 31b is in engagement with the sleeve 30, and the reverse drum 12 is held from revolving by means of the band B, thus holding the casing supporting the planetary gears stationary, consequently, holding the transmission shaft 13 stationary. Thus, movement of the drive shaft 1 is transmitted to the casing 17 which revolves in opposite direction to the normal movement of the transmission shaft, and thereby causes a reverse movement of the sliding shaft 31. Then, by gradually closing the passages P, a braking action can be obtained as the transmission shaft 13 is being held stationary. By slipping the reverse drum 12, any intermediate speed desired may be obtained with the passages P open. However, the speed obtained through the gearing is ordinarily sufficient for reverse movement.

When desired to use the mechanism as a brake, the sleeve 2 is disengaged from the fluted portion 4b of the connecting shaft 4, thereby disconnecting the engine from the transmission mechanism. The brake drum 6 is then prevented from rotating by the brake band B which does not require much effort when the passages P are opened. The brake band on drum 12 is also drawn tight so as to prevent drum 12 from rotating, thereby securing cage 9. The movement of the rear wheels may be transmitted into rotation of the transmission shaft 13 and casing 17. Then by regulating the openings in the passages P, the desired resistance to the movement of the vehicle may be obtained so as to slacken or otherwise regulate its movement.

The various fluted portions of sleeve 2, connecting shaft 4, transmission shaft 13, sleeve 30, and sliding shaft 31, are cut helically along their engaging edges, as shown in Fig. 1, and by the developed view, Fig. 9.

Thus, the one fluted portion slips relative to the other until the shoulder X of one engages the shoulder Y of the other, whereupon the fluted portions readily telescope as the various grooves and ridges are then in alinement with each other.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a power transmission mechanism, a driving shaft, a connecting shaft, clutch means for joining said shafts, a pinion gear mounted on said connecting shaft, planetary gears engageable with said pinion gear, a cage for said planetary gears, a transmission shaft connected to said cage, a ring gear engageable with said planetary gears, a casing secured thereto, fluid controlled means for regulating the relative movement of said casing and said transmission shaft, a driven means connected with said transmission shaft, and means for binding said connecting shaft when disengaged from said driven shaft so as to cause said fluid controlled means to react against the movement of said driven means.

2. In a power transmission mechanism, a drive shaft, a pinion gear connected therewith, planetary gears engageable with said pinion gear, a cage for said planetary gears, a transmission shaft connected to said cage, a ring gear engageable with said planetary gears, a casing secured thereto, means for regulating the relative movement of said casing and said transmission shaft, said regulating means comprising cylinder means secured to said shaft and extending towards said casing, said casing arranged eccentrically relative to said transmission shaft, rider means adapted to engage said casing and form variable chambers with said cylinders, fluid conduit means connecting one chamber with another, and control means for said fluid conduit means.

3. In a power transmission mechanism, a drive shaft, a pinion gear connected therewith, planetary gears engageable with said pinion gear, a cage for said planetary gears, a transmission shaft connected to said cage, a ring gear engageable with said planetary gears, a casing secured thereto, means for regulating the relative movement of said casing and said transmission shaft, and driven means selectively connectable with said casing or said transmission shaft, said regulating means comprising cylinder means secured to said transmission shaft and extending to said casing, said casing arranged eccentrically relative to said transmission shaft, rider means adapted to engage said casing and form variable chambers with said cylinders, fluid conduit means connecting one chamber with another, and control means for said fluid conduit means.

4. In a power transmission mechanism, a driving shaft, a connecting shaft, clutch means for joining said shafts, a pinion gear mounted on said connecting shaft, planetary gears engageable with said pinion gear, a cage for said planetary gears, a transmission shaft connected to said cage, a ring gear engageable with said planetary gears, a casing secured thereto, means for regulating the relative movement of said casing and said transmission shaft, a driven means connected with said transmission shaft, and means for binding said connecting shaft when disengaged from said driven shaft so as to cause said fluid controlled means to react against the movement of said driven means, said regulating means comprising cylinder means secured to said shaft and extending to said casing, said casing arranged eccentrically relative to said transmission shaft, rider means adapted to engage said casing and form variable chambers with said cylinders, fluid conduit means connecting one chamber with another, and control means for said fluid conduit means.

5. In a power transmission mechanism, a drive shaft, a pinion gear connected therewith, planetary gears engageable with said pinion gear, a cage for said planetary gears, a transmission shaft connected to said cage, a ring gear engageable with said planetary gears, a casing secured thereto, means for regulating the relative movement of said casing and said transmission shaft, said casing being revoluble in an opposite direction to the revoluble movement of said transmission shaft, and means for binding the movement of said transmission shaft so that the force of said driving shaft passes through said casing, said regulating means comprising cylinder means secured to said shaft and extending to said casing, said casing arranged eccentrically relative to said transmission shaft, rider means adapted to engage said casing and form variable chambers with said cylinders, fluid conduit means connecting one chamber with another, and control means for said fluid conduit means.

6. In a power transmission mechanism, a drive shaft, a pinion gear connected therewith, planetary gears connected with said pinion gear, a cage therefor, a transmission shaft connected to said cage, a ring gear engageable with said planetary gears and revoluble relative to said transmission shaft, a casing secured to said ring gear and arranged eccentrically relative to said transmission shaft and extending axially therewith, a plurality of cross members secured to said shaft, rod members capping said cross members and forming variable chambers therewith, said rod members engageable with said casing, said transmission shaft provided with passages therethrough connecting the chambers of each cross member, and arranged to pass a liquid back and forth between said chambers as said transmission shaft and casing undergo relative movement, and valve means for controlling said passages and regulating the relative movement of said transmission shaft and said casing.

7. In a power transmission mechanism, a drive shaft, a pinion gear connected therewith, planetary gears connected with said pinion gear, a cage therefor, a transmission shaft connected to said cage, a ring gear engageable with said planetary gears and revoluble relative to said transmission shaft, a casing secured to said ring gear, and arranged eccentrically relative to said transmission shaft and extending axially therewith, a plurality of cross members secured to said shaft, rod members capping said cross members and forming variable chambers therewith, said rod members engageable with said casing, said transmission shaft provided with passages therethrough connecting the chambers of each cross member, and arranged to pass a liquid back and forth between said chambers as said transmission shaft and casing undergo relative movement, valve means for controlling said passages and regulating the relative movement of said transmission shaft and said casing, and driven means selectively engageable with said casing or said transmission shaft.

8. In a power transmission mechanism, a drive shaft, a pinion gear connected therewith, planetary gears connected with said pinion gear, a cage therefor, a transmission shaft connected to said cage, a ring gear engageable with said planetary gears and revoluble relative to said transmission shaft, a casing secured to said ring gear and arranged eccentrically relative to said transmission shaft and extending axially therewith, a plurality of cross members secured to said shaft, rod members capping said cross members and forming variable chambers therewith, said rod members engageable with said casing, said transmission shaft provided with passages therethrough connecting the chambers of each cross member, and arranged to pass a liquid back and forth between said chambers as said transmission shaft and casing undergo relative movement, valve means for controlling said passages and regulating the relative movement of said transmission shaft and said casing, driven means selectively engageable with said casing or said transmission shaft, and clutch means for severing the connection between said driving shaft and said pinion gear so as to permit said transmission shaft and casing to react against the movement of said driven shaft.

In testimony whereof, I have hereunto set my hand at San Diego, California, this 11th day of July, 1929.

GUY A. E. STRAWN.